United States Patent [19]

Clemens et al.

[11] Patent Number: 4,886,606

[45] Date of Patent: Dec. 12, 1989

[54] METHOD OF PURIFYING CONDENSATE WATERS FOR STEAM REGENERATING EQUIPMENT

[75] Inventors: David H. Clemens, Willow Grove; Marvin J. Hurwitz, Elkins Park; Robert W. Walker, Fort Washington, all of Pa.

[73] Assignee: Rohm and Haas Company, Philadelphia, Pa.

[21] Appl. No.: 206,073

[22] Filed: Jun. 13, 1988

Related U.S. Application Data

[63] Continuation-in-part of Ser. No. 641,464, Dec. 17, 1975, abandoned, which is a continuation-in-part of Ser. No. 428,968, Dec. 27, 1973, abandoned.

[51] Int. Cl.[4] .............................. C02F 1/42; C02F 1/64
[52] U.S. Cl. ..................................... 210/684; 210/683; 210/807
[58] Field of Search ....................... 210/683, 807, 684; 521/32

[56] References Cited

U.S. PATENT DOCUMENTS

| | | | |
|---|---|---|---|
| 1,582,300 | 4/1926 | Otis | 210/42 |
| 2,330,865 | 10/1943 | Butzler | 210/34 |
| 2,504,695 | 4/1950 | Jukkola | 210/34 |
| 3,078,140 | 2/1963 | Hatch | 210/38 |
| 3,162,608 | 12/1964 | Mattano | 260/2.1 E |
| 3,179,703 | 4/1965 | Reiman | 260/2.1 E |
| 3,203,873 | 8/1965 | Wirth | 210/34 |
| 3,335,100 | 8/1967 | Geyer | 260/2.1 E |
| 3,367,889 | 2/1968 | Oline | 260/2.1 E |
| 3,454,493 | 7/1969 | Kun | 210/37 |
| 3,749,668 | 7/1973 | Walker | 210/37 |
| 3,767,600 | 10/1973 | Albright | 210/37 |
| 3,843,566 | 10/1974 | Barrett | 210/37 |

FOREIGN PATENT DOCUMENTS 860695 7/1958 United Kingdom ................. 210/37

OTHER PUBLICATIONS

Amberlite IRA-402, Bulletin IE-68-62, Apr. 1972.

*Primary Examiner*—Ernest G. Therkorn
*Attorney, Agent, or Firm*—Louis F. Kline, Jr.; Marc S. Adler

[57] ABSTRACT

Strong base ion exchange resins derived from crosslinked vinylbvenzyl chloride polymers are particularly suitable for purifying condensate waters for steam regenerating equipment. Preferred embodiments utilize gellular anion exchange resins to remove corrosion products from boiler condensate waters.

1 Claim, No Drawings

METHOD OF PURIFYING CONDENSATE WATERS FOR STEAM REGENERATING EQUIPMENT

This application is a continuation-in-part of U.S. application Ser. No. 641,464, filed Dec. 17, 1975, which in turn, is a continuation-in-part of U.S. application Ser. No. 428,968, filed Dec. 17, 1973, both now abandoned.

This invention concerns a process for purifying condensate waters for steam generating equipment using strong anion exchange resins derived from vinyl benzyl chloride.

Polishing of boiler condensate waters with anion exchange resins although known is believed to be truly effective only when practiced at low flow rates of less than 30 gal/min/sq.ft. High resin bead attrition, sudden pressure drop and resin fouling are characteristic of prior art anion exchange processes when higher flow rates are attempted.

Unlike the treatment of boiler feed or makeup water normally conducted at ambient temperatures, condensate is desirably treated at a temperature of 60° or 70° C. and sometimes in excess of 100° C. To avoid thermal degradation of ion exchange resins utilized to remove corrosion impurities from the condensate, the prior art processes have often required cooling of the influent condensate to a temperature of 40°-50° C.

The corrosion products are dissolved or suspended metal hydroxides and hydrous oxides with magnetite ($Fe_3O_4$) predominantly prevailing. Another commonly occurring corrosion product is hydrated ferric oxide ($Fe_2O_3H_2O$). Total removal of such impurities is critical in reducing start-up time, simplifying operations and increasing the versatility of the boiler cycle.

It is therefore clear that an improvement in "crud" removal at increased flow rates and at higher temperatures represents a major contribution to the industry.

It is a primary object of the invention to provide a commercial process for removing corrosion products from condensate waters for steam generating equipment. It is an additional objective to provide such a process which will remain effective at increased flow rates and elevated temperatures.

It has now surprisingly been discovered that anion exchange resins derived from polymers of crosslinked vinylbenzylchloride are particularly suitable for effectively removing corrosion products from boiler condensate waters for steam regenerating equipment. Preferred embodiments of the invention may be totally effective in removing magnetite for hundreds of hours. The process may be practiced as a continuous or batch process and may include adding a cation exchange step either in sequence or as a mixed bed system. Although the resins preferred in the process of the invention are gellular in nature, macroreticular resins may also be used.

The resins useful in the process of the present invention may be prepared by any suitable known process. A preferred polymerization technique however is suspension polymerization, particularly when macroreticular resins are desired. The term "suspension polymerization" is a term well known to those skilled in the art and comprises suspending droplets of the monomer or monomer mixture in a medium in which the monomer or monomer mixture is substantially insoluble. This may be accomplished by adding the monomer or monomer mixture with any additives to the suspending medium which contains a dispersing or suspending agent such as, for instance, in the case of an aqueous suspending medium, the ammonium salt of a styrene maleic anhydride copolymer, carboxymethyl cellulose, bentonite, polyvinylimidazoline, or poly(diallyldimethylammonium chloride). The dispersant is preferably added in an amount of 0.001 to 5%, more preferably from 0.01 to 1%.

Often polymerization processes will utilize additives or modifiers which have specialized functions. These additives should of course be chosen such as to be mutually compatible. For example a preferred colloidal stabilizer for the process of the invention is gelatin. Gelatin has an isoelectric point at about pH 8. It should therefore be readily understood that when gelatin is the stabilizer the pH of the polymerization medium should not pass through this point to prevent possible serious impairment of the bead forming mechanism. Another stabilizer which may be useful in the process of the invention is magnesium silicate. Being an inorganic additive, the pH of a polymerization medium containing magnesium silicate instead of gelatin does not require such pH limitation.

Alkalinity of the polymerization medium may be maintained by one or more additions of a suitable base or the presence of a sufficient amount of buffering compounds. Other methods of maintaining an alkaline medium during polymerization will occur to those skilled in the art.

The polymerization of vinylbenzyl chloride and crosslinker may be accelerated by a suitable catalyst.

Catalysts which provide free radicals which function as reaction initiators include benzoyl peroxide, tert-butyl hydroperoxide, cumene peroxide, tetralene peroxide, acetyl peroxide, caproyl peroxide, tert-butyl perbenzoate, tert-butyl diperphthalate, methyl ethyl ketone peroxide. Other suitable classes of free radical generating compounds include the azo catalysts.

Another method of effecting copolymerization is by subjecting the reaction mixture to ultra-violet light in the presence of suitable catalysts at ambient or slightly elevated temperatures. Such catalysts include benzoin and azobisisobutyronitrile.

The amount of catalyst required is roughly proportional to the concentration of the mixture of monomers, the usual range is from 0.01% to 3% by weight of catalyst, with reference to the total weight of the monomer mixture. The preferred range is from 0.5% to 1.5%. The optimum amount of catalyst is determined in large part by the nature of particular monomers selected, including the nature of the impurities which may accompany said monomers.

The polymerization process may be carried out at temperatures ranging from 60° to 100° C., although preferably the polymerization is performed between 70°-90° C.

The vinylbenzyl chloride resins of the invention are hereinafter referred to as VBC resins. The prior art chloromethylated resins are referred to as CME resins.

Any of the common polyvinyl crosslinking monomers well-known in the ion exchange art are suitable. A particularly preferred crossliner is divinyl benzene. Other suitable crosslinkers are divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono-, or dithio-derivatives of glycols, and of resorcinol; divinylketone, allyl acrylate, diallyl fumarate, diallyl maleate, trimethylolpropane trimethacrylate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, 1,2-di($\alpha$-methylmethylene sulfonamide)ethylene, trivinylbenzene, trivinylnaphthalene, and polyvinylanthracenes. Additional suitable crosslinking monomers include the following: glycol dimethacrylates, such as ethylene glycol dimethacrylate, and polyvinyl ethers of polyhydric alcohols, such as divinoxyethane and trivinoxypropane.

The ratio of vinylbenzyl chloride monomer to crosslinking monomer may vary depending on the use for which the copolymer is intended and upon the nature of crosslinker, although generally the crosslinker is present in an amount of 0.1 tp 30%. Preferably it is present in an amount of 1 to 10% and most preferably in an amount of 5 to 8%. It is also possible to utilize a mixed crosslinking system.

A wide variety of amines can be employed in the amination reaction. Thus, primary, secondary, and tertiary alkylamines or arylamines can be employed. Polyalkylenepolyamines include ethylenediamine, diethylenetriamine, triethylenetetramine, tetraethylenepentamine, dimethylamine, trimethylamine, propylenediamine, and the like. Aminoalcohols such as dimethylaminoethanol can also be used successfully.

A preferred resin of the process of this invention employs a trialkylamine as the aminating agent, thus producing strong base, quaternary ammonium anion exchangers. The alkyl radical does not generally contain more than 4 carbon atoms, with trimethylamine being the preferred amine.

The following example illustrates a method of preparing the typical resin useful in the practice of the invention. It should not be construed as limiting the scope of the invention. All percentages throughout the specification and claims are by weight unless otherwise indicated.

Example I
A. Copolymerization

| Aqueous Phase | | Organic Phase | |
|---|---|---|---|
| 477.5 gm. | tap water | 40.4 gm. | divinylbenzene (79.2% active) |
| 20.0 gm. | polydiallyldimethyl ammonium chloride | 359.6 gm. | vinylbenzyl chloride |
| 2.2 gm. | gelatin (pharmaceutical grade) | 4.0 gm. | benzoyl peroxide |
| 4.2 gm. | boric acid | | |
| 5.1 gm. | sodium hydroxide (50%) | | |

A solution of the aqueous phase (above) is prepared and added to a 2-liter, three necked flask fitted with a two-bladed stirrer, thermometer, nitrogen inlet tube and reflux condenser. The organic phase is premixed and added to the aqueous phase without stirring. Stirring is then begun at 205 rpm. A dispersion formed by on-off cycling of the stirrer. After the dispersion is formed, the temperature is heated to 80° C. and held at this temperature for 10 hours to complete the polymerization. The aqueous phase is removed, and the suspension polymer is washed twice with a total of 1000 ml. water. The polymer is then dried at 80° C. for 16 hours yielding 397 gm of dried copolymer which contained 18.0 chlorine.

B. Aminolysis

| | |
|---|---|
| 160 gm. | dry copolymer (above), screened −20 + 70 (U.S. Standard Sieve Series) |
| 300 ml. | ethylene dichloride |
| 450 ml. | methanol |
| 65 gm. | anhydrous trimethylamine |

The copolymer and ethylene dichloride are mixed in a 2-liter flask fitted with a stirrer, thermometer, dry ice condenser and inlet port for trimethylamine. After allowing the copolymer to swell in ethylene dichloride for 30 minutes, methanol is added to fluidize the mixture. Stirring is begun, and the temperature of the contents is lowered to 10° C. by external cooling. The trimethylamine is then added over 2 hours to the reactor maintaining the temperature at 10° C. The temperature is then increased to 60° C. over 4 hours. The excess amine and about 100 ml. of methanol are then removed by distillation. Water is added slowly at this point to maintain fluidity; distillation is continued until all the methanol and ethylene dichloride is recovered. The batch is cooled to 50° C., washed with water, and the resin obtained by suction filtration. There is obtained 380 grams of 55.2 solids resin having a total anion exchange capacity (TAEC) of 3.85 milliequivalents/gram and a true strong base capacity (TSB) of 3.75 milliequivalents/gram.

The condensate polishing process of the present invention places a premium on the physical stability of an ion exchange resin. The piston pump test is an accelerated test developed to measure an ion exchange resins's resistance to attrition under simulated and exaggerated conditions.

PISTON PUMP TEST

The test is performed on 200 ml. of resin in one inch diameter columns operating under constant pressure (40 lbs/ft.). The resin is subjected to repeated cycles of treatment with 1.2 N-$H_2SO_4$ and 3.5 N-NaOH with water rinses between each solution. The acid and base solutions are passed upflow through the resin bed and the water rinses are passed downflow. Cycling is controlled automatically by a programmer, and the flow rates during exhaustion (acid) and regeneration (base) are measured every five cycles. The test is stopped after 50 cycles, since a good correlation has been developed between field performance and piston pump test performance at this level. The change in flow rate from the initial reading to that following 50 cycles is an excellent measure of the resin's physical stability. If breakdown occurs, smaller resin particles (fines) are being formed, and at constant pressure, a drop in flow rate would be observed. Conversely, if the resin exhibits no physical breakdown, the particle size remains essentially constant and hence the flow rate stays constant.

A second measure of resin stability in the piston pump test is the change in perfect bead count in the resin sample after 50 cycles. Representative resin samples taken before and after the test are examined microscopically for cracked beads. Obviously, the higher the perfect bead count after the test, the more stable the resin.

Strong base anion exchange resins prepared from vinylbenzyl chloride according to the procedure of Example I exhibit excellent physical stability in the piston pump test compared to prior art resins prepared from chloromethylated styrene.

The test results are obtained on resin samples that were screened to the exact sample particle size, therefore, the marked improvement in performance exhibited by the VBC resin can be directly attributed to its manner of preparation and not to variance in particle size distribution.

Quaternary ion exchange resins may be somewhat liable to decomposition particularly when in the hydroxide form. This instability is greatly enhanced by increased temperature. Two routes are followed by this decomposition reaction.

(1)

(2)

In order to test the useful anion exchange resins for thermal stability, strong base anion exchange vinyl benzyl chloride resins of the general type described in Example I and a corresponding chloromethylated prior art resin are subjected to the following test.

The resin as received is converted completely to the hydroxide form using approximately 1000 mls. of 1N NaOH for 15 mls. of resin. The resin is rinsed with D.I. water and placed in an appropriate container containing excess D.I. water (at least a 20 to 1 water to resin ratio) and the container is placed in an oven of appropriate temperature. Periodically the sample is removed, completely converted to the HCl form and evaluated for solids content, and true strong base capacity. After this, the resin is reconverted to the hydroxide form using 1 N-HCl followed by 1 N-NaOH and replaced in the same temperature environment. Several spot checks are made at all temperatures to confirm that the resins are completely in the hydroxide form during the testing periods. The results indicate that the VBC resins have consistently greater thermal stability than the corresponding DME resins.

A further advantage that the strong base VBC resins have over prior art CME resins is improved regeneration efficiency. The true regeneration efficiency of a strong base resin is determined by plotting the ratio-actual column capacity/theoretical column capacity (% utilization), versus the ratio-equivalents of regenerant used/total equivalents available. A typical VBC resin when tested for regeneration efficiency as defined above and in accordance with known analytical procedures showed a significant improvement when compared to the regeneration efficiency of a typical and corresponding CME resin. The improved regeneration efficiency of VBC over the CME resins at normal use levels of regenerant is in the range of at least about 10% and may be as high as 30% for some embodiments under preferred conditions. The significance of this improved regeneration efficiency is that the end user can use less regenerant to achieve a desired column capacity when using VBC resins than he can when using the CME resins, thereby greatly reducing his overall regenerant costs.

The following process example illustrates the method of the invention and the purifying capabilities of the resin at high flow rates.

PROCESS EXAMPLE

The anion exchange resin of Example I is placed in a 1 inch diameter column 2 ft. deep and demineralized water having a temperature of 60° C. is pumped through at a flow rate of 70 gal./sq.ft./min. In order to simulate the "crud" load of a high pressure boiler a finely divided magnetite ($Fe_3O_4$) with an average particle size of 4.5 microns is injected in the recirculating stream at a level of 100 parts per billion. The test is continued for 200 hours and the $Fe_3O_4$ is completely removed (to a level of less than 1 ppb) for the 200 hours operation.

We claim:

1. A process for removing corrosion products from high pressure boiler condensate waters at elevated temperatures which comprises contacting the waters containing the corrosion products at a temperature of at least 100° C. with a mass of crosslinked vinyl benzyl chloride strong base ion exchange resin wherein the crosslinker is a polyvinyl compound.

* * * * *